US009161183B2

(12) United States Patent
Mun et al.

(10) Patent No.: US 9,161,183 B2
(45) Date of Patent: Oct. 13, 2015

(54) METHOD OF PERFORMING AND SUPPORTING HANDOVER IN BROADBAND WIRELESS ACCESS SYSTEM (75) Inventors: Du Hyun Mun, Anyang-Si (KR); Yong Ho Kim, Anyang-Si (KR); Gene Beck Hahn, Anyang-Si (KR); Ki Seon Ryu, Anyang-Si (KR)

(73) Assignee: LG Electronics Inc., Seoul (KR)

( * ) Notice: Subject to any disclaimer, the term of this patent is extended or adjusted under 35 U.S.C. 154(b) by 919 days.

(21) Appl. No.: 12/595,789

(22) PCT Filed: Apr. 11, 2008

(86) PCT No.: PCT/KR2008/002056
§ 371 (c)(1),
(2), (4) Date: Oct. 13, 2009

(87) PCT Pub. No.: WO2008/127037
PCT Pub. Date: Oct. 23, 2008

(65) Prior Publication Data
US 2010/0061289 A1 Mar. 11, 2010

(30) Foreign Application Priority Data
Apr. 12, 2007 (KR) .................. 10-2007-0036026

(51) Int. Cl.
H04W 36/08 (2009.01)
H04W 4/12 (2009.01)

(52) U.S. Cl.
CPC ............. *H04W 4/12* (2013.01); *H04W 36/08* (2013.01)

(58) Field of Classification Search
USPC .................. 370/312, 331; 455/436–438
See application file for complete search history.

(56) References Cited

U.S. PATENT DOCUMENTS

| 2005/0073990 | A1 | 4/2005 | Chang et al. | |
|---|---|---|---|---|
| 2005/0272403 | A1* | 12/2005 | Ryu et al. | 455/403 |
| 2006/0030322 | A1* | 2/2006 | Kim et al. | 455/436 |
| 2006/0035639 | A1* | 2/2006 | Etemad et al. | 455/436 |
| 2006/0189318 | A1* | 8/2006 | Kang et al. | 455/436 |
| 2006/0239264 | A1* | 10/2006 | Kang et al. | 370/390 |
| 2006/0239265 | A1* | 10/2006 | Son et al. | 370/390 |
| 2006/0245392 | A1* | 11/2006 | Buckley et al. | 370/331 |

(Continued)

FOREIGN PATENT DOCUMENTS

| KR | 10-2006-0011226 A | 2/2006 |
|---|---|---|
| WO | WO-2006/011763 A2 | 2/2006 |

(Continued)

*Primary Examiner* — Brandon Renner
*Assistant Examiner* — Scott M Sciacca
(74) *Attorney, Agent, or Firm* — Birch, Stewart, Kolasch & Birch, LLP (57) ABSTRACT A method for performing a handover between MBS zones of a mobile station receiving multicast and broadcast service (MBS) data in a wireless access system is disclosed. The method for performing the handover between first and second MBS zones of the mobile station in a wireless access system includes receiving the MBS from a first base station belonging to the first MBS zone which uses a first MBS zone identifier (ID), requesting the handover between the first and second MBS zones, receiving parameter information including a second MBS zone identifier (ID), from the first base station, and receiving the MBS from a second base station belonging to the second MBS zone, using the parameter information, wherein the second MBS zone uses the second MBS zone identifier (ID) which is needed to receive the MBS.

7 Claims, 3 Drawing Sheets

(56) References Cited

U.S. PATENT DOCUMENTS

| | | | |
|---|---|---|---|
| 2007/0047493 A1* | 3/2007 | Park et al. | 370/331 |
| 2007/0115871 A1* | 5/2007 | Zhang et al. | 370/318 |
| 2007/0189162 A1* | 8/2007 | Song et al. | 370/230 |
| 2007/0286066 A1* | 12/2007 | Zhang et al. | 370/208 |
| 2008/0056219 A1* | 3/2008 | Venkatachalam | 370/342 |
| 2008/0175238 A1* | 7/2008 | Venkatachalam | 370/390 |
| 2009/0080351 A1* | 3/2009 | Ryu et al. | 370/312 |
| 2009/0207771 A1* | 8/2009 | Lindskog et al. | 370/312 |

FOREIGN PATENT DOCUMENTS

| | | | | |
|---|---|---|---|---|
| WO | WO 2006/070992 A1 * | 7/2006 | | H04Q 7/38 |
| WO | WO 2006085732 A1 * | 8/2006 | | H04L 12/24 |

* cited by examiner

MSS #1 monitors and stores
    HBO : CID = 1
        MBS Zone id = 1

MSS #2 monitors and stores
    CNN : CID = 2
        MBS Zone id = 1

MSS #3 monitors and stores
    M_Shop : CID =3
        MBS Zone id = 2

FIG. 3

METHOD OF PERFORMING AND SUPPORTING HANDOVER IN BROADBAND WIRELESS ACCESS SYSTEM

TECHNICAL FIELD

The present invention relates to a wireless access system, and more particularly to a method for performing and supporting a handover of a wireless access system.

BACKGROUND ART

Figure 1:
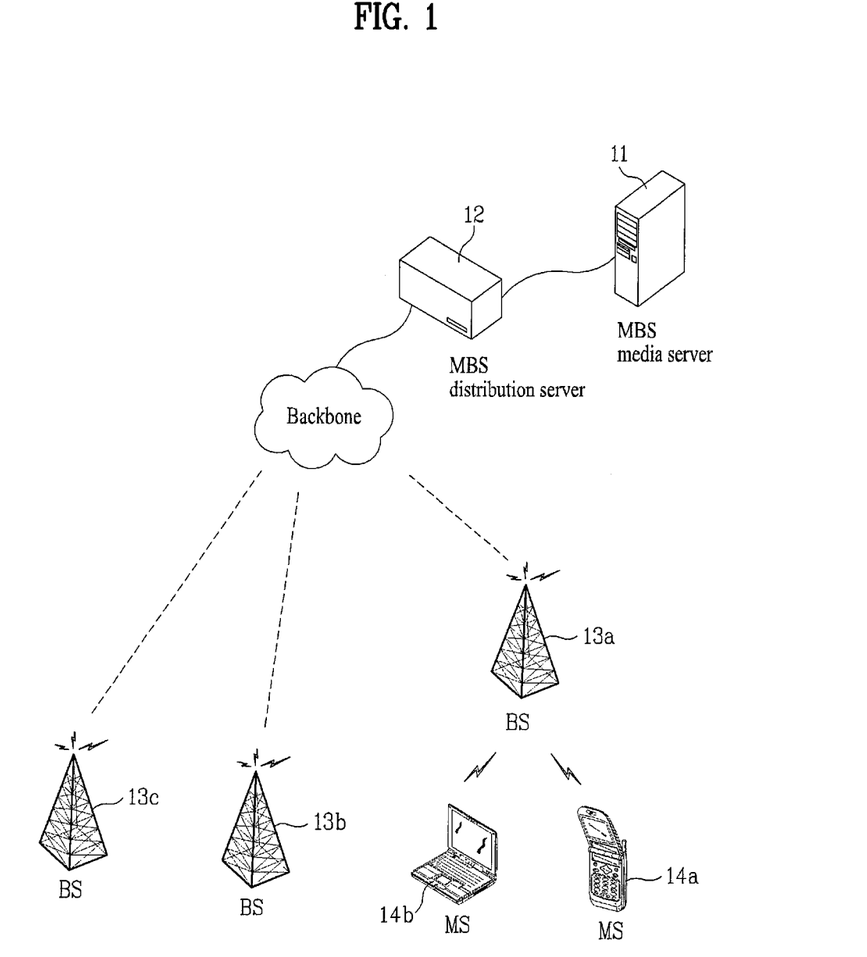
FIG. 1 is a conceptual diagram illustrating a system for providing a multicast broadcast service in a wireless access system.

FIG. 1 is a conceptual diagram illustrating a system for providing a multicast broadcast service in a wireless access system.

Referring to FIG. 1, the multicast broadcast system includes a Multicast and Broadcast Service (MBS) media server 11, an MBS distribution server 12, base stations (BSs) 13a, 13b, and 13c, and mobile stations (MSs) 14a and 14b.

In this case, the mobile station (MS) is a generic term of electronic appliances capable of wirelessly communicating the base station (BS). The mobile station (MS) may include all kinds of devices having mobility, for example, a mobile terminal or a user equipment (UE). The MBS media server provides base stations (BSs) with MBS data, and performs MS authentication (or UE authentication) for MBS media or encryption key distribution. The MBS distribution server 12 schedules MBS data provided to several base stations (BSs). Optionally, the MBS distribution server may be omitted or the MBS media server may schedule the MBS data. The base station (BS) receives MBS data over a backbone network, and provides the MS or UE with the MBS data via a wireless interface. In this case, the mobile station (MS) may receive the MBS data from the base station (BS).

The MBS for use in the above-mentioned conventional wireless access system can be mainly classified into first and second MBS service types. The first MBS service type is a single-BS access scheme, which is capable of being provided by a single BS within a single cell. The second MBS service type enables several BSs to make a single MBS zone, such that it provides the MBS zone with necessary services using a single MBS zone identifier (ID). For example, the second MBS service type receives the same data burst from the MBS server in several cells belonging to the MBS zone, such that it provides services. Therefore, although the mobile station (MS) moves from one cell to another cell in a single MBS zone, the mobile station (MS) can receive necessary services without a handover. That is, the above-mentioned second MBS service type is a multi-BS access scheme, which can acquire MBS-service continuity and a macro-diversity gain.

The above single-BS access scheme enables a single base station (BS) to provide the MBS service. For example, the single base station (BS) equally distributes a connection ID (CID) allocated to the MBS multicast to all MSs or UEs, such that it provides the MBS service. The multi-BS access scheme enables several base stations (BSs) belonging to the single MBS zone to provide the MSs or UEs with the multicast service using a multicast CID.

The wireless access system implements data communication between the BS and the MS (or UE) according to a service flow. This service flow includes a service flow identifier (SFID), a connection ID (CID), and a quality of service (QoS) parameter. In this case, the SFID identifies a corresponding service flow between the BS and the MS. The CID identifies a connection capable of delivering service flow traffic. The QoS parameter indicates a quality of the service flow.

A general service flow connection is located between the BS and the MS on a one-to-one basis. However, the MBS provides a point-to-multipoint service, which transmits data from a single source to several receivers. Therefore, the MBS service provides several receivers with the same data over a common radio frequency (RF) channel so as to effectively use radio resources.

The base station (BS) transmits the same MBS data to several mobile stations (MSs) via a single service flow. That is, when the MBS service flow is generated between the BS and the MS, the BS assigns the same multicast CID to several mobile stations (MSs), each of which requests reception of MBS data. Therefore, one or more MSs can simultaneously receive the MBS data using the same multicast CID.

Presently, the MBS service enables a single BS to equally assign a predetermined CID to all MSs, each of which desires to receive MBS data. Therefore, although the MS moves from one BS to another BS in the MBS zone, it continuously receives the same MBS data without any handover.

However, a method for performing a handover between MBS zones according to the multi-BS access scheme has not been well known in the art. For example, if the MS moves from a first MBS zone to a second MBS zone, the first and second MBS zones may have different parameters assigned to the MBS service. For example, the first and second MBS zones may have different multicast CIDs. Therefore, the MS must be re-established in the MBS server of a new MBS zone, such that it can receive a desired service within a target MBS zone. Also, the loss of conventional MBS data may unavoidably occur. That is, the MS is unable continuously receive the conventional MBS data.

When a mobile station (MS), which is receiving real-time MBS contents (or real-time MBS content data), enters a new MBS zone during a handover process from an old MBS zone to the new MBS zone, the MS is unable to pre-recognize services provided from the new MBS zone. Therefore, the loss of received MBS packet data may unavoidably occur.

DISCLOSURE

Technical Problem

Accordingly, the present invention is directed to a method for performing and supporting a handover in broadband wireless access system that substantially obviates one or more problems due to limitations and disadvantages of the related art.

An object of the present invention devised to solve the problem lies on a method for receiving a seamless MBS data service during a handover process from one MBS zone to another MBS zone.

Another object of the present invention devised to solve the problem lies on a method for pre-receiving specific information indicating whether MBS data of a neighboring MBS zone can be provided before a corresponding MS is handed over from a current MBS zone to the neighboring MBS zone. That is, the present invention recognizes whether MBS data can be provided or not, such that it can select a handover-target MBS zone.

A further another object of the present invention devised to solve the problem lies on a method for performing and supporting a handover between MBS zones in a wireless access system.

Technical Solution

The object of the present invention can be achieved by providing a method for performing a handover between a first and a second Multicast and Broadcast Service (MBS) zones in a wireless access system, the method comprising: receiving the MBS from a first base station belonging to the first MBS zone which uses a first MBS zone identifier (ID); requesting the handover between the first and the second MBS zones; receiving parameter information including a second MBS zone identifier (ID), which is needed to receive the MBS, from the first base station; and receiving the MBS from a second base station belonging to the second MBS zone, which uses the second MBS zone ID, using the parameter information.

Preferably, the parameter information has previously been transferred from an upper network entity of the second MBS zone to the first base station via an upper network entity of the first MBS zone, before the handover is completed.

Preferably, the parameter information includes at least one of a second MBS zone identifier (ID), MBS capability information, a second base station ID, and a multicast connection ID (CID).

Preferably, the parameter information further includes MBS error parameter information.

Preferably, the parameter information further includes location information of the MBS data.

Preferably, the method further comprises receiving, by the mobile station, a message including the location information of the MBS data to receive the MBS data provided from the second MBS zone.

Preferably, the location information of the MBS data includes at least one of an MBS symbol offset indicating a location of the MBS data, a number of MBS symbols, an MBS sub-channel offset, a number of MBS sub-channels, and a burst attribute list.

Preferably, the burst attribute list includes at least one of a burst symbol offset, a number of burst symbols, a burst sub-channel offset, a number of burst sub-channels, a logical flow identifier (ID), Media Access Control (MAC) Protocol Data Unit (PDU) size information, and security information of the second MBS zone.

In another aspect of the present invention, provided herein is a method for supporting a handover between first and second Multicast and Broadcast Service (MBS) zones in a wireless access system, the method comprising: receiving, by a first base station belonging to the first MBS zone which uses a first MBS zone identifier (ID), a handover request message between the first and the second MBS zones from a mobile station; requesting, by the mobile station, parameter information required for receiving multicast and broadcast service (MBS) data in the second MBS zone, in a range from an upper network entity of the first MBS zone to another upper network entity of the second MBS zone using a second MBS zone identifier (ID); and receiving parameter information provided from the upper network entity of the second MBS zone in the upper network entity of the first MBS zone.

Preferably, the method further comprising: transmitting, by the upper network entity of the first MBS zone, a specific message including capability information of a mobile station (MS) and a media access control (MS MAC) address of the mobile station to the upper network entity of the second MBS zone; and receiving, by the upper network entity of the first MBS zone, a message including MBS error parameter information from the upper network entity of the second MBS zone.

Advantageous Effects

The method for performing/supporting the handover in the wireless access system according to the present invention has the following effects. If the mobile station (MS) is handed over from a previous MBS zone to a new MBS zone, the mobile station (MS) can pre-receive the MBS zone ID and the MBS type and multicast CID information, which are required to receive the MBS service in the new MBS zone. Although the handover between MBS zones occurs, the MS can receive the MBS service having lossless MBS data using the above pre-received information. Also, although the handover between MBS zones occurs, the present invention can guarantee continuity of the service.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Mode for Invention

Reference will now be made in detail to the preferred embodiments of the present invention, examples of which are illustrated in the accompanying drawings.

It should be noted that the following embodiments are implemented by applying technical characteristics of the present invention to a broadband wireless access system. The remaining parts other than the following embodiments have been prescribed in "IEEE Standard for Local and metropolitan area networks, Part 16: Air Interface for Fixed and Mobile Broadband Wireless Access Systems, DRAFT Standard for Local and metropolitan, October 2007" of the broadband wireless access system. In the following detailed description of the appended drawings, procedures or steps, which may make vague the inventive features of the present invention, will herein be omitted for the convenience of description, and other procedures or steps well known to those skilled in the art will also be omitted.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention. For example, the mobile station (MS) is a generic term of electronic appliances capable of wirelessly communicating the base station (BS), and may also be called a mobile terminal or a user equipment (UE) as necessary. The base station (BS) located at the end of a network wirelessly communicates with the mobile station (MS), such that it provides the mobile station (MS) with a specific service, and may also be called a Node-B or a fixed station.

Figure 2:
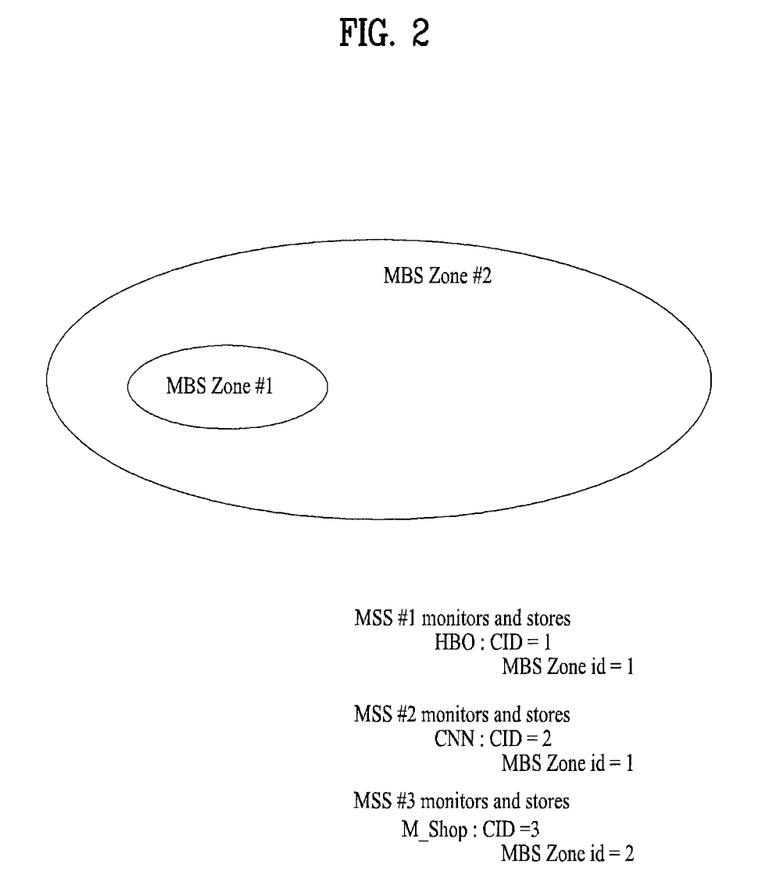
FIG. 2 is a conceptual diagram illustrating a method for constructing an MBS zone to provide an MBS service in a wireless access system according to the present invention.

FIG. 2 is a conceptual diagram illustrating a method for constructing an MBS zone to provide an MBS service in a wireless access system according to the present invention.

Referring to FIG. 2, the MBS zone includes one or more base stations capable of providing a specific MBS service. This MBS zone indicates a regional range. Namely, the MBS zone is a specific area in which the base station provides several mobile stations with the same MBS service because it has assigned the same multicast CID and the same security association (SA) information to the several mobile stations. This MBS zone may include a plurality of base stations. Several base stations of a single MBS zone can provide the same MBS service using a single multicast CID. Some base stations having the same MBS zone ID transmit MBS data by applying the same multicast CID to a single MBS service.

Referring to FIG. 2, the base station may include a plurality of MBS zone IDs. Namely, the base station belonging to a first MBS zone (MBS zone #1) has two MBS zone IDs #1 and #2. Therefore, the mobile station which performs a handover between two base stations having the same MBS zone ID can continuously receive MBS data without performing the additional procedures such as the multicast CID reset to receive the MBS data.

Figure 3:
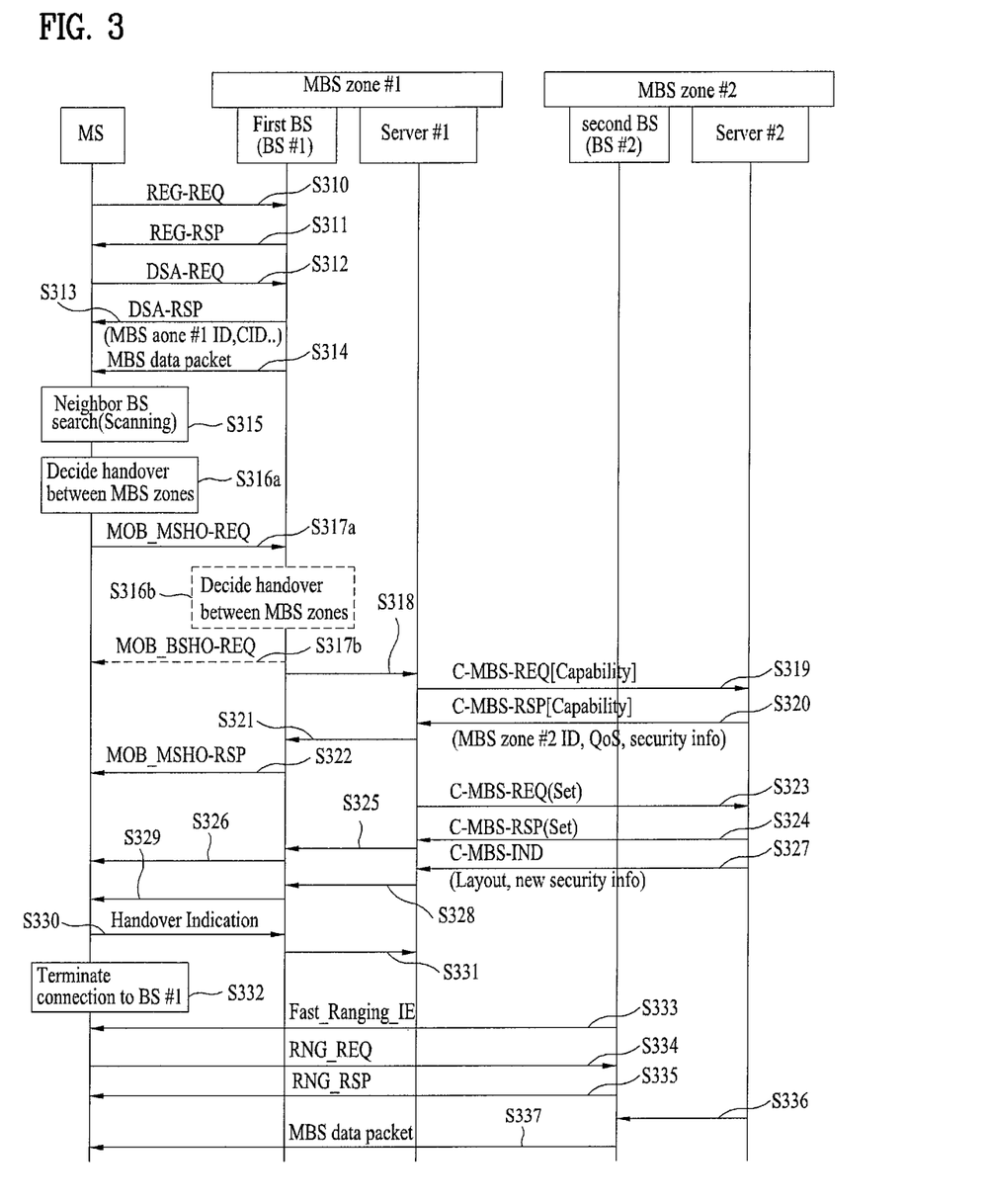
FIG. 3 is a flow chart illustrating a method for performing a handover between MBS zones according to the present invention.

FIG. 3 is a flow chart illustrating a method for performing a handover between MBS zones according to the present invention.

Referring to FIG. 3, in order to allow the mobile station to receive the service, the mobile station must register in a corresponding base station. As a part of this registering process, the mobile station transmits a network registration request message (REG-REQ) to a first base station belonging to the first MBS zone at step S310, and receives a registration response message (e.g., REG-RSP) at step S311.

By the above steps S310 and S311, the mobile station registers in the first base station. In the network registration process of the first base station, the mobile station can receive specific information indicating whether the first base station provides the MBS service. In this case, the first base station is belonging to the first MBS zone, and relays the mobile station with the MBS service provided from the first MBS server.

The mobile station (MS) transmits a service request message (DSA-REQ) to the first base station (BS #1), such that it requests the MBS service from the first base station (BS #1).

The DSA-REQ message may include a multicast IP address and a port number of the multicast- or broadcast-service. However, it should be noted that the service request message (DSA-REQ) may be transmitted from the base station to the mobile station.

As a response of the above step S312, the first base station includes downlink service parameter information in a service generation response message (DSA-RSP), and transmits the DSA-RAP message including the downlink service parameter information to the mobile station at step S313.

At step S313, service parameter information includes a MBS zone #1 ID, a connection ID (CID) of a first MBS zone, a QoS parameter, and a security association identifier (SAID), etc.

The mobile station can recognize an area of a corresponding MBS service using the MBS zone ID. Also, the mobile station can receive MBS data (e.g., data packet) provided from the first MBS server using the first MBS zone multicast CID at step S314.

As a handover procedure, the mobile station can receive network topology information configured in the form of a broadcast message upon receiving advertisement messages (e.g., MOB_ADV_MSG) from the base station. The network topology information may be included in a Downlink Channel Descriptor/Uplink Channel Descriptor (DCD/UCD) message. The first base station may receive a DCD/UCD message of a neighboring base station (e.g., a second base station) over a backbone network. The mobile station may receive a DCD/UCD message of the second base station (BS #2) belonging to the second MBS zone. In other words, the mobile station can be synchronized with the second base station using network topology information included in the DCD/UCD message of the second base station.

While the mobile station receives necessary services in the first MBS zone, it may periodically or non-periodically perform scanning of a neighboring base station (e.g., the second base station) at step S315.

The first base station assigns scanning information (e.g., a scanning period, a scanning beginning point, the number of repeating times of the scanning, and an idle period) to the mobile station. In this case, the mobile station detects a preamble of a neighboring base station (e.g., a second base station) which uses the same carrier as that of the first base station, such that it can scan the neighboring base station. The mobile station searches for the second base station during the scanning period, measures a channel quality using a physical medium, and is synchronized to a downlink.

If the mobile station has already been received an ID of a base station (e.g., the second base station) belonging to a handover-target MBS zone or an advertisement message including the DCD/UCD message, the scanning of the second base station and the synchronization process between the mobile station and the second base station may be simplified.

In more detail, provided that the mobile station has a signal quality higher than that of the first base station of the first MBS zone serving as a current service zone, and can continuously receive the same MBS data in the second MBS zone, it can determine a handover between the first and second MBS zones at step S316a.

In this case, the mobile station may request the handover from the first base station. Therefore, if the mobile station needs to be handed over from the first MBS zone to the second MBS zone, the mobile station transmits a handover request message (MOB_MSHO-REQ) between MBS zones to the first base station at step S317a.

According to another embodiment of the present invention, the first base station may decide the handover. In this case, an entity of the above steps S316a and S317a may be changed to another entity. If the entity of the above steps S316a and S317a is a base station, the following operations will be executed.

In this case, the handover beginning caused by the base station may include not only a general handover but also the handover between MBS zones. Namely, the first base station can decide a handover target base station (e.g., the second base station) on the basis of MS capability requested by the handover target base station and MS QoS requirements at step S316b.

If the first base station determines the handover, it may transmit the MOB_BSHO-REQ message at step S317b.

If the base station decides whether to perform the handover, the registration process between the mobile station and the first base station and the MBS data reception process are equal to those of the handover decision process of the mobile station.

Referring back to FIG. 3, the first base station of the first MBS zone, which has received the MOB_MSHO-REQ message, transmits the handover request to the first MBS server using a handover notification message of the first MBS zone at step S318.

The first MBS server transmits a backbone message C-MBS-REQ (Capability) to the second MBS server, such that it informs the second MBS server of the beginning of the handover between MBS zones. In this case, the C-MBS-REQ (Capability) message may include information associated with the MS capability at step S319.

The following table 1 shows an exemplary data format of the C-MBS-REQ (Capability) message.

TABLE 1

| Syntax | Length | Contents |
|---|---|---|
| C-MBS-REQ{ | | |
| Message_id, | | |
| Operation_Type(Action), | | |
| Action_Type(Capability), | | |
| Object_id(BSID), | | |
| Attribute_List | | |
| MS MAC address, | | |
| MS Capability Information | | |
| } | | |

With reference to Table 1, the C-MBS-REQ(Capability) message includes at least one of a message identifier (ID), an operation type, an action type, an object identifier (ID), and an attribute list (Attribute_List).

In this case, the message ID (Message_id) includes information for discriminating between individual messages. The operation type indicates whether a corresponding message is either an indication message of a real execution or a notification message of a specific service. The action type may indicate the capability of either the mobile station or the MBS server, or may indicate setup information for a real MBS service. The object ID includes an ID of a target base station at which the corresponding message is received or an ID of the MBS server. That is, the object ID enables the corresponding message to be accurately delivered to a destination. The attribute list (Attribute_List) indicates the principal contents of the corresponding message, and may include an MS MAC address and MS capability information. That is, the MBS server of the second zone receives the C-MBS-REQ (Capability) message, such that it determines whether the mobile station can suitably receive the MBS service.

The second MBS server transmits the C-MBS-RSP (Capability) message to the first MBS server on the basis of MS capability information included in the C-MBS-REQ (Capability) message at step S320.

The C-MBS-RSP (Capability) message includes parameter information, which needs to receive MBS data from the second MBS zone. The following table 2 shows an exemplary format of the C-MBS-RSP (Capability) message.

TABLE 2

| Syntax | Length | Contents |
|---|---|---|
| C-MBS-RSP{ | | |
| Message_id, | | |
| Operation_Type(Action), | | |
| Action_Type(Capability), | | |
| Object_id(MBS zone_ID), | | |

TABLE 2-continued

| Syntax | Length | Contents |
|---|---|---|
| Attribute_List | | |
| MBS Capability Information, | | |
| MBS Zone #2 ID, | | |
| #2 BS ID, | | |
| Multicast CID | | |
| } | | |

With reference to Table 2, the C-MBS-RSP(Capability) message includes a second MBS zone ID (MBS zone #2 ID), a multicast CID, a second base station ID (#2 BS ID) of the second MBS zone, and MBS capability information. Also, the C-MBS-RSP(Capability) message may further include parameters required for receiving Quality of Service (QoS) and security information.

The first MBS server may transmit the second MBS zone information included in the C-MBS-RSP (Capability) message to the first base station at step S321.

The first base station informs the mobile station of the MOB_MSHO-RSP message using parameter information required for the mobile station which performs the handover at step S322.

The MOB_MSHO-RSP message may include at least one of a second MBS zone ID (MBS zone #2 ID), a multicast CID of the second MBS zone, a second BS ID (#2 BS ID), and MBS capability information, etc. The MBS capability information may include specific information whether the handover process is a macro-diversity handover. For example, if the MBS capability information is denoted by 2 bits, "Bits #0" is a general handover, and "Bits #1" is a macro-diversity handover.

The mobile station, which has received the MOB_MSHO-RSP message, can recognize the second MBS server as the second MBS zone ID during the handover process between MBS zones. Also, the mobile station can continuously receive MBS data, which has been received in the first MBS zone, in the second MBS zone using the multicast CID.

The first MBS server may request the set of information required for the mobile station, which receives data from the second MBS zone, using the C-MBS-REQ (Set) message at step S323.

The following table 3 shows an exemplary format of the C-MBS-REQ (Set) message.

TABLE 3

| Syntax | Length | Contents |
|---|---|---|
| C-MBS-REQ{ | | |
| Message_id, | | |
| Operation_Type(Action), | | |
| Action_Type(Set), | | |
| Object_id(BSID), | | |
| Attribute_List: | | |
| MBS Zone ID | | |
| MBS Type | | |
| Security Information | | |
| } | | |

With reference to Table 3, the C-MBS-REQ(Set) message includes at least one of a message ID (Message_id), an operation type (Operation_Type), an action type (Action_Type), an object ID (Object_id), and an attribute list (Attribute_List), etc. In this case, the attribute list (Attribute_List) may include an MBS zone ID, an MBS type, and security information, etc.

The second MBS server, which has received the C-MBS-REQ (Set) message, transmits the C-MBS-RSP (Set) message to the first MBS server. The C-MBS-RSP (Set) message includes specific information required for the mobile station which receives MBS data in the second MBS zone.

The following table 4 shows an exemplary format of the C-MBS-RSP (Set) message.

TABLE 4

| Syntax | Length | Contents |
|---|---|---|
| C-MBS-RSP{<br>    Message_id,<br>    Operation_Type(Action),<br>    Action_Type(Set),<br>    Object_id(MBS zone_ID),<br>    Attribute_List:<br>        MBS Error parameter information<br>} | | |

Referring to FIG. 4, the C-MBS-RSP(Set) message may includes a message ID (Message_id), an operation type (Operation_Type), an action type (Action_Type), an object ID (Object_id(MBS zone_ID)), and an attribute list (Attribute_List), etc. In this case, the attribute list (Attribute_List) may include MBS error parameter information, etc. The C-MBS-RSP(Set) message may further include an MBS zone ID, an MBS type, and security information (e.g., a multicast group key), etc.

The first MBS server, which has received the C-MBS-RSP (Set), transmits parameter information included in the above Table 4 to the first base station by wire or wirelessly at step S325.

The first base station configures a backbone message received from the first MBS server in the form of specific message capable of being recognized by the mobile station, and transmits the backbone message to the mobile station. The first base station transmits the parameter information received from the first MBS server to the mobile station via a downlink at step S326.

The mobile station can recognize the second MBS zone and the second base station using the parameter information included in the C-MBS-RSP (Set) message, and can pre-recognize the MBS data provided from the second MBS zone.

After the backbone message is exchanged between the second MBS server and the first MBS server, a C-MBS-IND message is created to indicate the burst assigned for MBS data provided from the second MBS zone. The second server is able to transmit the C-MBS-IND message, which includes information of the MBS service provided from the second MBS zone, to the first MBS server at step S327.

The following table 5 shows an exemplary format of the C-MBS-IND message.

TABLE 5

| Syntax | Length | Contents |
|---|---|---|
| C-MBS-IND{<br>    Message_id,<br>    Operation_Type(Notify),<br>    Action_Type(MBS Portion Layout),<br>    Object_id(BSID),<br>    Layout Attribute List:<br>        MBS Portion Symbol Offset,<br>        MBS Portion Subchannel Offset,<br>        MBS Portion Number of Symbols,<br>        MBS Portion Number of Subchannels<br>        Time Reference<br>        List of Burst Attributes<br>        {<br>            Burst Symbol Offset,<br>            Burst Subchannel Offset,<br>            Burst No of Symbols,<br>            Burst No of Subchannels,<br>            Coding Scheme,<br>            List of MAC PDU attributes<br>            {<br>                multicast CID,<br>                Logical Flow ID, | | |

TABLE 5-continued

| Syntax | Length | Contents |
|---|---|---|
| (if needed)<br>            }<br>        }<br>} | | MAC PDU Size,<br>New security Information |

With reference to Table 5, the C-MBS-IND message may include location information (e.g., layout attribution) of MBS data which is used to receive MBS service data of the second MBS zone. The C-MBS-IND message may include a symbol offset indicating the location of data, the number of symbols, a sub-channel offset, the number of sub-channels, and List of Burst Attribute (LBA) information, etc.

In this case, the List of Burst Attribute (LBA) information may include a burst symbol offset, the number of burst symbols, a burst sub-channel offset, the number of burst sub-channels, a coding scheme, and List of MAC PDU attribute information.

In this case, the above-mentioned MAC PDU attribute list information may include a multicast CID provided from the second MBS zone, a logical flow ID, etc. Also, the above-mentioned MAC PDU attribute list information may further include MAC PDU size information and new security information.

The mobile station receives an indication message (e.g., C-MBS-IND) to receive MBS data of the second MBS zone from the first base station, and is ready to receive data from the second base station of the second MBS zone.

The first MBS server transmits parameter information included in the C-MBS-IND message to the first base station at step S328. The first base station informs the mobile station of MBS parameter information, which has received from the first MBS server, over a downlink channel at step S329.

The handover is completed, on the condition that all connections to the first base station controlling the mobile station have been terminated and the service of the first base station has been interrupted. The mobile station transmits a handover indication message to the first base station, such that it completes the handover procedure at step S330.

The first base station transmits information indicating the handover indication message to the first MBS server, such that it informs the first MBS server that the mobile station has terminated the MBS service in the first MBS zone at step 331. Thereafter, the mobile station terminates the connection to the first base station at step S332.

The mobile station and the second base station must perform the initial ranging or the handover ranging. The initial ranging process is used to acquire basic information required for data communication between the mobile station and a neighboring base station. In the initial ranging process, the mobile station establishes an uplink power offset value or an uplink timing offset value using the information, which has already been acquired from the second base station in a real handover, such that it reduces a delay time caused by the handover.

The mobile station begins to perform the ranging, so that it is connected to the second base station of the second MBS zone at step S333.

In this case, according to one embodiment of the present invention, before the mobile station enters the second MBS zone, the mobile station has already received all the information required for receiving MBS data from the second MBS zone, such that the mobile station can quickly perform the ranging process. Therefore, the mobile station transmits the ranging request message (RNG_REQ) to the second base station at step S334.

The second base station transmits the ranging response message (RNG-RSP) to the mobile station, such that it performs the ranging process at step S335.

The second MBS server transmits MBS data, which is being provided from the second MBS zone, to the second base station at step S336. The mobile station, which has completed the handover procedure, can receive MBS data via the multicast CID, which has been assigned from the second base station, from the second MBS zone at step S337.

The above-mentioned messages and parameters have been disclosed for only illustrative purposes of the present invention. If required, other messages or other parameters may also be used to implement the same purpose as that of the present invention. It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, the present invention provides a method for performing and supporting a handover in a wireless access system. According to the present invention, if the mobile station moves from a current MBS service zone to a specific MBS service zone, it can receive a seamless MBS service from a serving base station of the specific MBS zone. The technical scope or spirit of the present invention may be extended or be applied to other technical fields, such that the mobile station can receive a seamless data service.

The invention claimed is:

1. A method for performing a handover between a first and second Multicast and Broadcast Service (MBS) zones in a wireless access system, the method comprising:
receiving, by a mobile station, MBS data from a first base station belonging to the first MBS zone, wherein a first MBS zone identifier (ID) is used for the first MBS zone;
receiving, by the mobile station, a broadcast message including downlink channel descriptors and uplink channel descriptors of neighboring base stations including a second base station belong to the second MBS zone from the first base station;
synchronizing with the neighboring base stations by using the at least one of a downlink channel descriptor and an uplink channel descriptor;
scanning the synchronized neighboring base stations;
determining to handover to the second base station based on a result of the scanning;
transmitting, by the mobile station, a handover request message to request the handover between the first and the second MBS zones;
receiving, by the mobile station, a handover response message including parameter information from the first base station; and
receiving, by the mobile station, the MBS data from the second base station, using the parameter information,
wherein the parameter information includes a second MBS zone identifier (ID), MBS capability information, a second base station ID, a multicast connection ID (CID), a logical flow identifier (ID) generated from a server of the second MBS zone, Media Access Control (MAC) Protocol Data Unit (PDU) size information of the second MBS zone and security information of the second MBS zone,
wherein the MBS capability information indicates whether the handover between the first and the second MBS zones is a macro-diversity handover, and
wherein the security information includes a multicast group key.

2. The method according to claim 1, wherein the parameter information has previously been transferred from the server of the second MBS zone to the first base station via a server of the first MBS zone, before the handover is completed.

3. The method according to claim 1, wherein the parameter information further includes MBS error parameter information.

4. The method according to claim 1, wherein the parameter information further includes location information of the MBS data.

5. The method according to claim 4, wherein the location information of the MBS data includes at least one of an MBS symbol offset indicating a location of the MBS data, a number of MBS symbols, an MBS sub-channel offset, a number of MBS sub-channels, and a burst attribute list.

6. The method according to claim 5, wherein the burst attribute list includes at least one of a burst symbol offset, a number of burst symbols, a burst subchannel offset, and a number of burst sub-channels.

7. The method according to claim 1, further comprising:
receiving, by the mobile station, a message including location information of the MBS data to receive the MBS data provided from the second MBS zone.

* * * * *